United States Patent
Acharya et al.

(10) Patent No.: US 10,520,927 B2
(45) Date of Patent: Dec. 31, 2019

(54) SYSTEM AND METHOD FOR MANAGING AN INDUSTRIAL EQUIPMENT SYSTEM

(71) Applicant: ABB Schweiz AG, Baden (CH)

(72) Inventors: Mithun P. Acharya, Cary, NC (US); Shakeel Mahate, Raleigh, NC (US); Markus Aleksy, Ludwigshafen (DE); Jonas Bronmark, Vasteras (SE)

(73) Assignee: ABB Schweiz AG, Baden (CH)

( * ) Notice: Subject to any disclaimer, the term of this patent is extended or adjusted under 35 U.S.C. 154(b) by 159 days.

(21) Appl. No.: 15/665,361

(22) Filed: Jul. 31, 2017

(65) Prior Publication Data

US 2019/0033833 A1    Jan. 31, 2019

(51) Int. Cl.
 *G05B 19/418* (2006.01)
(52) U.S. Cl.
 CPC ........ *G05B 19/4183* (2013.01); *G05B 2219/34427* (2013.01); *G05B 2219/35156* (2013.01)
(58) Field of Classification Search
 CPC ...... G05B 19/4183; G05B 2219/34427; G05B 2219/35156
 See application file for complete search history.

(56) References Cited

U.S. PATENT DOCUMENTS

| | | |
|---|---|---|
| 2009/0015410 A1 | 1/2009 | Puzzio et al. |
| 2010/0077466 A1* | 3/2010 | Lowe ............... H04L 63/062 726/6 |
| 2010/0141447 A1* | 6/2010 | Neuwirth ........... G06Q 20/203 340/572.1 |
| 2015/0287318 A1* | 10/2015 | Nair .................. G08C 17/02 340/5.52 |
| 2017/0103239 A1 | 4/2017 | Deyoung et al. |
| 2017/0192414 A1 | 7/2017 | Mukkamala et al. |

OTHER PUBLICATIONS

Search Report and Written Opinion, PCT Appln. No. PCT/US18/44501, dated Oct. 18, 2018, 12 pgs.

* cited by examiner

*Primary Examiner* — Omeed Alizada
(74) *Attorney, Agent, or Firm* — Taft Stettinius & Hollister LLP; J. Bruce Schelkopf

(57) ABSTRACT

A system and method for monitoring operating conditions of an industrial installation system including a plurality of industrial assets. A plurality of transponders or beacons is located in a facility or location, where each of the transponders defines a zone in which some of the industrial assets are located. One or more mobile devices is configured to identify assets located within one or more of the zones to provide information to a data acquisition and processing system, which monitors the operating conditions of each of the industrial assets. Each of the one or more mobile devices is authorized depending on a location within the facility, the identity of a user, or based on a time of day. Industrial assets that require support, such as maintenance or replacement, are identified. Authorized mobile devices are configured to transmit information to and to receive information from the data acquisition and processing system.

21 Claims, 7 Drawing Sheets

SYSTEM AND METHOD FOR MANAGING AN INDUSTRIAL EQUIPMENT SYSTEM

TECHNICAL FIELD

The present disclosure relates to an industrial system and more particularly to a system and method for managing the industrial assets of an industrial equipment system.

BACKGROUND

Many industries such as electric utilities, mining operations, and water utilities employ industrial automation systems which include a relatively large number of industrial assets. An industrial asset may, for example, include one or more of industry infrastructure, operating equipment, tangible equipment, physical equipment, and processing equipment. An industrial asset may have an intrinsic value based upon one or more parameters including, but not limited to, products produced using the industrial asset, operating costs of the industrial asset, and losses associated with use of the industrial asset. An industrial asset may be serviceable as a set of components or as a single entity.

An example of an industry that employs an industrial automation system including industrial assets is an electric utility company. An electric utility company may include a power transmission and distribution system. The power transmission and distribution system includes a plurality of industrial assets, including, for example, transmission lines, substations, transformers, circuit breakers, inverters, controllers, power sources, power storage devices, and other types of industrial assets. The management of such industrial assets may include industrial asset operation, industrial asset maintenance, industrial asset health monitoring, and industrial asset inventory tracking.

Industrial automation systems, in different embodiments, include a distributed asset control system and a supervisory control system. These systems can be operated from a control room with an operator or operators who are in charge of reviewing the status of the industrial automation system, as well as disseminating information provided by either the distributed asset control system or the supervisory control system as needed to field of facility personnel. For instance in one procedure, at the end of a work day, a facility operator might inform the next shift operator(s) or back office support staff about critical issues and observations.

The amount of information generated by the distributed asset control system and the supervisory control system is not only substantial, but is also highly complex. As the amount of information being generated by a data acquisition system running in parallel with the distributed asset and supervisory control systems, the operators will be inundated with data. Because value determinations regarding data content needs to be made, the operator can become a bottleneck in the dissemination of information. What is needed therefore is a solution to the problem of the centralized role of an operator who decides with whom and when to share data. What is needed, therefore, is an improved system and method for managing an industrial system and, in particular, industrial system automation.

SUMMARY

Exemplary embodiments include unique systems, methods, techniques and apparatuses for monitoring the operating condition of an industrial installation system having a plurality of pieces of equipment, devices, installations, and components. Further embodiments, forms, objects, features, advantages, aspects and benefits of the disclosure shall become apparent from the following description and drawings.

In one embodiment, there is provided an industrial equipment system configured to monitor a plurality of industrial assets. The system includes a plurality of identifying tags, wherein each of the identifying tags is configured to be physically located with one of the plurality of industrial assets. A plurality of transponders is located within the system, wherein each of the transponders is configured to have a predetermined range of communication and wherein each of the transponders transmits a unique transponder identifier identifying the transponder. A data acquisition and processing system is configured to receive, to process, and to store in a memory, the received and processed asset data associated with the plurality of industrial assets. A mobile device software application is configured to reside on a mobile device. The software application is configured: i) to receive the transponder identifier transmitted by the transponder; ii) to transmit the transponder identifier with the mobile device over a communication system to the data acquisition and processing system; and iii) to receive asset data from the data acquisition and processing system.

In another embodiment, there is provided a method of monitoring operating conditions of an industrial equipment system including a plurality of industrial assets. The method includes: monitoring communications from a plurality of mobile devices; authorizing one or more of the plurality of mobile devices to receive industrial asset information; determining a location of each of the one or more of the authorized mobile devices; generating a list of industrial assets within a zone of the locations of the authorized mobile devices; and receiving information related to one of the listed industrial assets from the mobile device.

DETAILED DESCRIPTION OF ILLUSTRATIVE EMBODIMENTS

Figure 1:
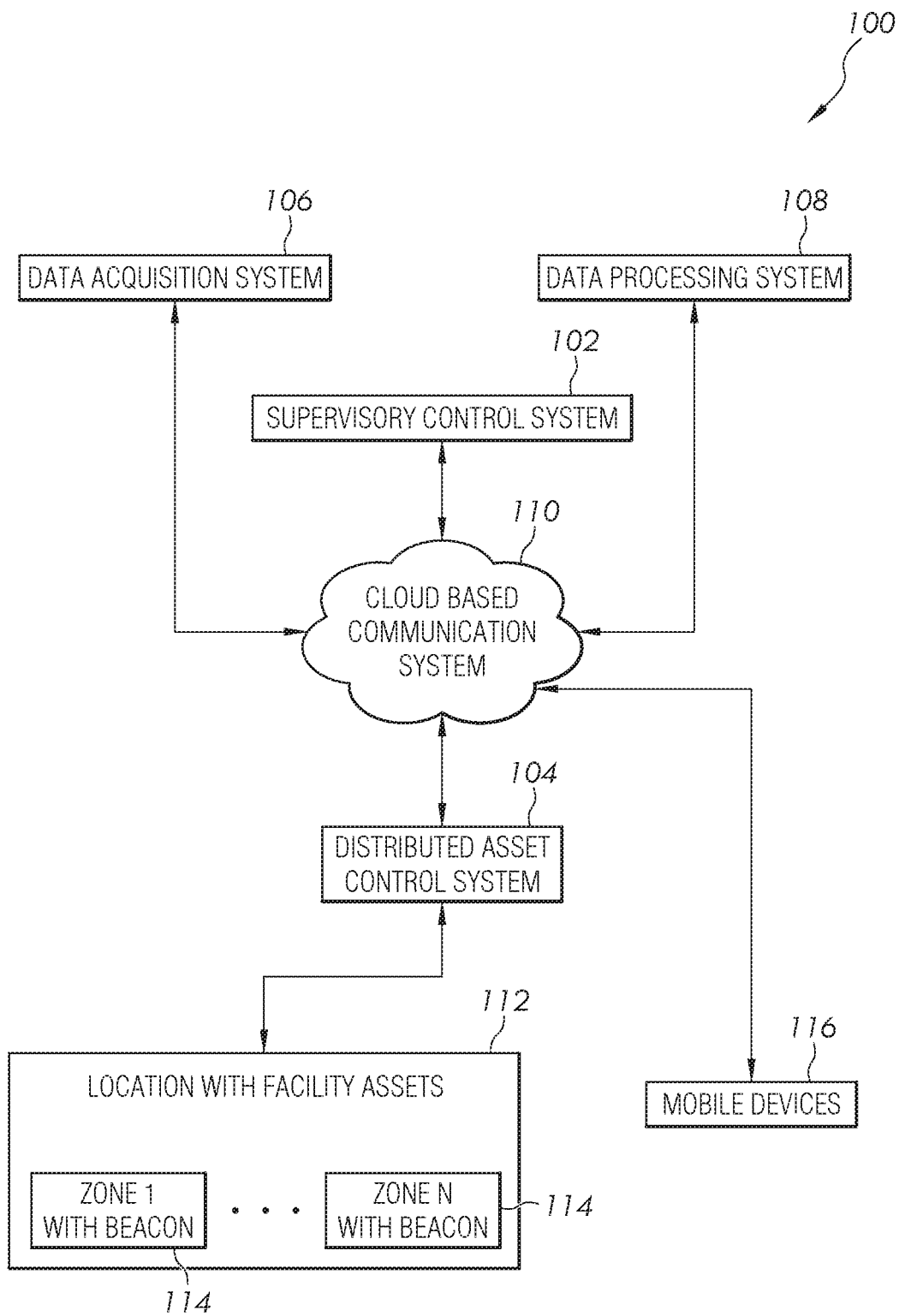
FIG. 1 is a block diagram of one embodiment of an industrial asset management system communicatively coupled to a plurality of industrial assets of an industrial system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

FIG. 1 illustrates one embodiment of an industrial asset management system 100 including a supervisory control system 102, a distributed asset control system 104, a data acquisition system 106, and a data processing system 108. Each of the systems 102, 104, 106, and 108 are communicatively coupled together through a cloud based communication system 110. In one embodiment, the system 110 includes a cloud based server and memory. In one embodiment, the cloud based system 110 is maintained by the owner of the industrials asset management system. In another embodiment, the cloud based communication system 110 is maintained by a third party.

The data acquisition system 106 is configured to receive asset data associated with at least one of the industrial assets. The data acquisition system 106 transmits the received asset data to the data processing system 108 via a communication system, such as the cloud-based communication system 110. In one embodiment, the data acquisition system 106 formats and/or configures the received asset data prior to forwarding the asset data to the data processing system 108 via the cloud based communication system 110. In different embodiments, the communication system 110 in not limited to a cloud based system but includes, any one of or combination of a cloud based system, a central communication system, a mesh network, a cellular network, or a peer-to-peer system.

The data processing system 108 is configured to perform data processing functions on the received asset data and to generate processed asset data. The data processing system 108 transmits the processed asset data to the supervisor control system 102, via the communication system. In one embodiment, the data processing system 108 aggregates the asset data received from the data acquisition system 106. The data processing system 108 transmits the aggregated asset data to the supervisory control system 102.

In one or more embodiments, the data processing system 108 includes an operating characteristics application which provides an assessment of the current operating conditions and how those conditions compare to a known set of preferred operating characteristics. In one embodiment, the assessment is based on a time period, such as a prior day, a prior week prior month. The data processing system 108 provides various information signals and data based on different analytical models. Based on this data, as well as data from various other data sources, a future state application of the data processing system 108 generates a predicted information signals and data with various probability levels. The data processing system 108, in different embodiments, uses machine learning models to generate this information which includes the use of a rolling history of the operations.

In one embodiment, the supervisory control system 102 is configured to display asset data and processed asset data on a user interface display system. In an embodiment, the supervisory control system 102 includes a user interface configured to receive data via the communication system 110. In an embodiment, the supervisory control system 102 is configured to communicate with various different devices via a web interface supported by a web application and/or a web service.

In an embodiment, the user supervisory control system 102 is configured to provide an actionable notification associated with the asset data and/or the processed asset data. Examples of actionable notifications include, but are not limited to, a notification to perform maintenance, a triggered alert such as a temperature being above a threshold value, and instructions as to how to repair, replace and/or compensate for a failing or failed industrial asset.

In an embodiment, the supervisory control system 102 is configured to display a variety of information such as for example, including but not limited to, a location of an industrial asset in a zone, a health status of an industrial asset, an operating status of an industrial asset, a software state of an industrial asset, and a hardware state of an industrial asset. In an embodiment, the supervisory control system 102 is configured to implement business intelligence and/or reporting functionality, which may be displayed via the user interface display system. In an embodiment, the supervisory control system 102 is configured to display nominal asset data collection rates and deviations from the normal asset data collection rates.

In an embodiment, the data processing system 108 is configured to provide asset data and/or processed asset data to the supervisory control system 102. The supervisory control system 102 is configured to display one or more of asset data, processed asset data, data received from the data processing system 108, changes detected at an industrial asset, changes detected at the data acquisition system 106, changes detected at the data processing system 108, changes detected at the industrial asset management system 100, modifications made to an industrial asset, modifications made to the data acquisition system 106, modifications made to the data processing system 108, and modifications made to the industrial asset management system 100.

The distributed asset control system 104 is operatively connected to a plurality of facility assets 112, which are physically located in one or more locations or facilities. As disclosed herein, a facility includes but is not limited to one or more buildings, one or more industrial plants, or one or more connected enterprises located at a single location or at multiple locations.

Each facility is divided into one or more zones 114, where each of the zones includes a communication device which is configured to communicate with one or more mobile devices 116. In one embodiment, the communication device is transponder or beacon, such as a Bluetooth beacon, having a range of communication of about one hundred (100) feet. In other embodiments, the beacon is configured to provide a communication protocol adapted to communicate with the one or more mobile devices within a generally known and predetermined communication range. In still other embodiments, the beacon is configured to have a larger range of communication. In different embodiments, the industrial asset management system 100 includes a locating system which provides location information to the mobile device based on, for instance, a global positioning system (GPS).

Figure 2:
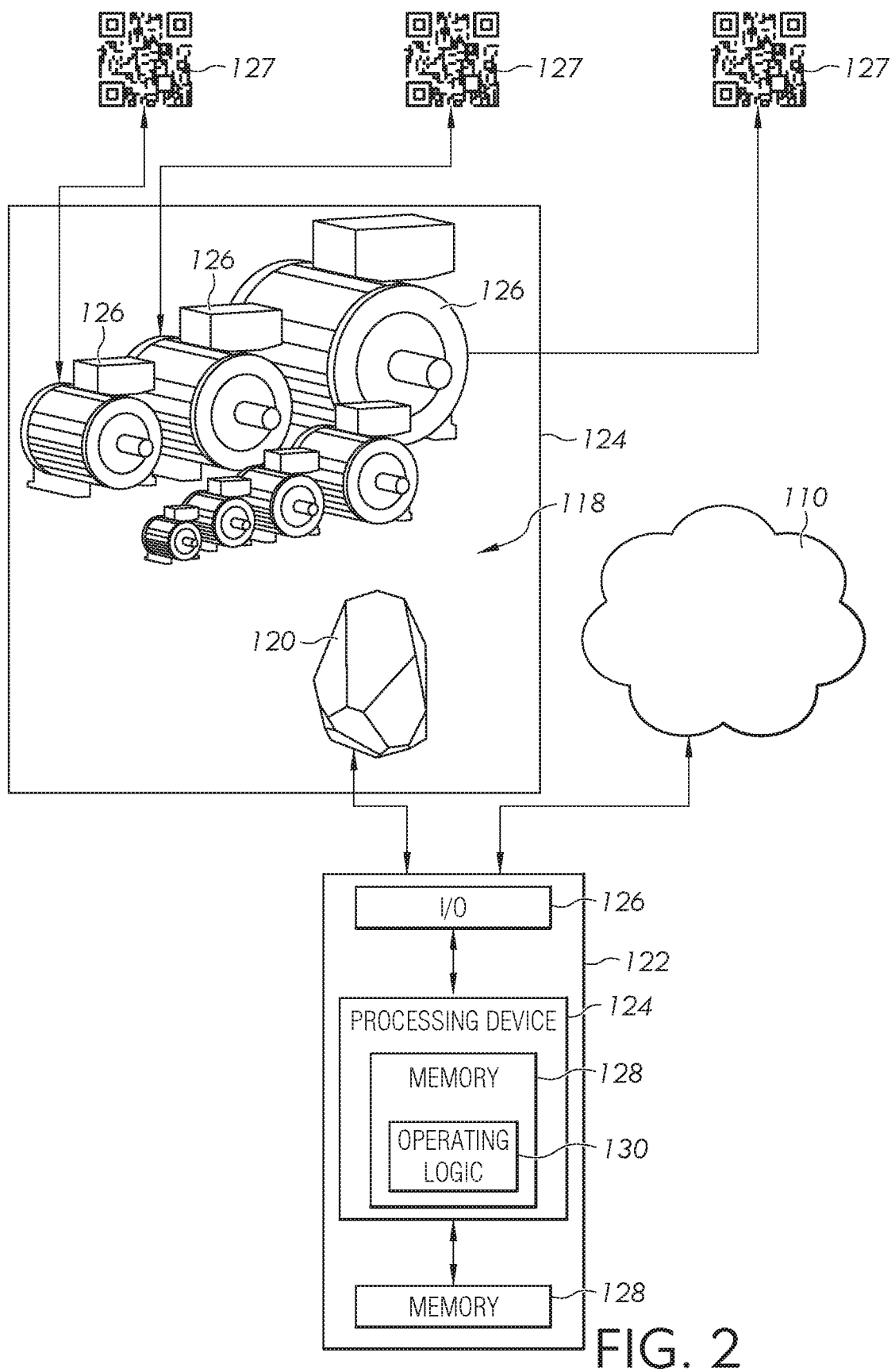
FIG. 2 is a block diagram of a mobile device communicating through a cloud based data system to determine and to provide a status of industrial assets.

FIG. 2 illustrates a zone 118 having a Bluetooth beacon 120 communicating with a mobile device 122. The zone 118 includes a boundary 124 defined by a signal range of the beacon 120. One or more industrial assets 126 are physically located within the zone 118. In different embodiments, the industrial assets include engines, motors, pumps, generators, fans, automated devices, and assembly lines. One or more of the assets 126 is identified by an identifier 127, which can include linear barcodes, matrix barcodes, such as quick response (QR) codes, and other identification codes. A QR code is illustrated. In other embodiments, a near field communication (NFC) tag is used. In each of these examples, close physical contact of the mobile devices to the identifier is not required.

The mobile device 122 includes a processing device 124, an input/output device 126, memory 128, and operating logic 130. Furthermore, the mobile device 122 communicates with the Bluetooth beacon 120 and the cloud based communication system 110. In different embodiments, the mobile device is a laptop computer, a tablet computer, a netbook computer, a personal digital assistant, a cellular phone, a watch, glasses, safety helmets, and a mobile phone. In some or all of the mobile devices, the device includes a communication circuit, which is located in the input/output device 126, or elsewhere in the device, to provide communication with a cellular system having cell towers and with the beacon 120. The mobile devices are configured to transmit, receive, and display data. In addition, some or all of the mobile devices include security certificates installed by the information technology organization. Data is encrypted, enabled, and follows data protocols and policies established by the organization in order to access data.

The input/output device 126 allows the mobile device 122 to communicate with the external device the beacon 120 using Bluetooth technology. Other types of wireless short range communications are contemplated. For example, the input/output device 126 may be a network adapter, network card, Bluetooth card, interface, or a port (e.g., a USB port, serial port, parallel port, an analog port, a digital port, VGA, DVI, HDMI, FireWire, CAT 5, or any other type of port or interface). The input/output device 126 may be comprised of hardware, software, and/or firmware. It is contemplated that the input/output device 126 includes more than one of these adapters, cards, or ports.

The beacon 120, in different embodiments, is any type of device that allows data to be received from or outputted to the mobile device 122.

In one embodiment, the Bluetooth beacons 120 are Bluetooth Low Energy (BLE) Beacons which are installed throughout a facility with a density of one beacon per a predetermined number square meters. The number and density of beacons installed is be dictated by the accuracy level and the proximity of various industrial assets in a plant. The beacons 120 are not wired to any industrial asset. Instead, they are placed in a central location in an area or zone. In different embodiments, the beacons are battery powered, are connected to a power supply, or are embedded inside access points and routers. The beacons 120 in different embodiments include management dashboards that provide information about the battery life of the beacon and also allow an information technology person or team to manage the Beacon identification (ID) information to an Application for (ID) mapping. In different embodiments, multiple applications are associated with one beacon, for example, a safety application which would provide different levels of safety information.

The processing device 124, in different embodiments, is a programmable type, a dedicated, hardwired state machine, or a combination of these. The device 124 includes a single processor, multiple processors, Arithmetic-Logic Units (ALUs), Central Processing Units (CPUs), Digital Signal Processors (DSPs) or the like. For forms of the processing device 124 with multiple processing units, distributed, pipelined, and/or parallel processing can be utilized as appropriate. The processing device 124, in different embodiments, is to monitor or control the performance the operations described herein or may be utilized in one or more additional applications. In the depicted form, the processing device 124 is of a programmable variety that executes algorithms and processes data in accordance with the operating logic 130 as defined by programming instructions (such as software or firmware) stored in the memory 128. Alternatively or additionally, the operating logic 130 for processing device 128 is at least partially defined by hardwired logic or other hardware. The processing device 124 can be comprised of one or more components of any type suitable to process the signals received from the input/output device 126 or elsewhere, and provides desired output signals. Such components include digital circuitry, analog circuitry, or a combination of both.

The memory 128, in different embodiments, is of one or more types, such as a solid-state variety, electromagnetic variety, optical variety, or a combination of these forms. Furthermore, the memory 128 is volatile, nonvolatile, or a combination of these types, and some or all of memory 128 includes the use of a portable variety, such as a disk, tape, memory stick, cartridge, or the like. In addition, the memory 128 stores data that is manipulated by the operating logic 130 of the processing device 128, such as data representative of signals received from and/or sent to the beacon 120, in addition to or in lieu of storing programming instructions defining the operating logic 130 just to name one example.

Figure 3:
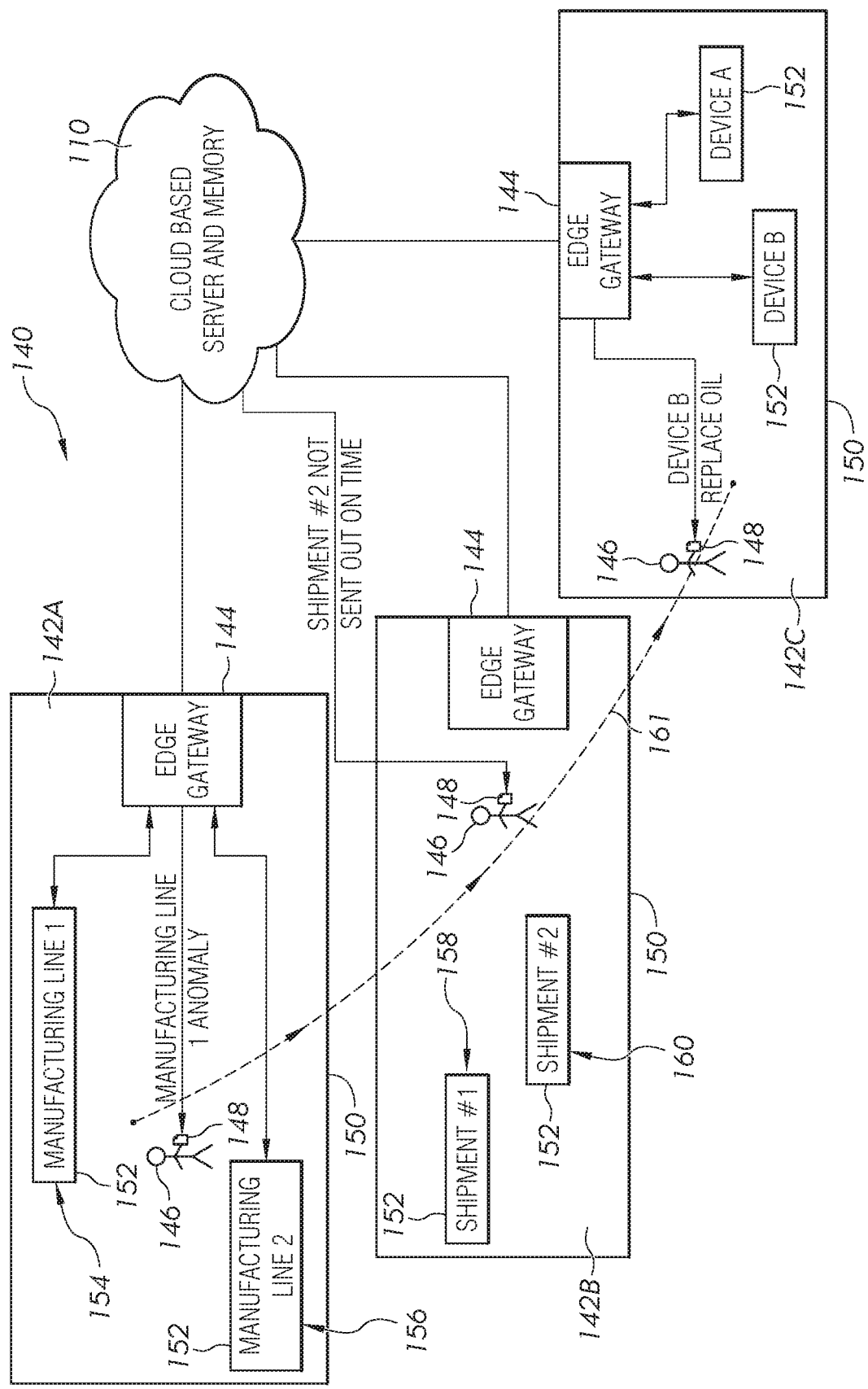
FIG. 3 is a block diagram determining and providing the status of industrial assets through a cloud based data system with a mobile device.

FIG. 3 illustrates an example of a location 140 having a plurality of zones 142A, 142B, and 142C, each of which includes an edge gateway 144. In one embodiment, the edge gateway 144 is a Bluetooth beacon, such as that illustrated in FIG. 2. Each of edge gateways 144 is communicatively connected to the cloud based communication system 110.

The edge gateway 144 provides for short range communication between a user 146 having a mobile device 148 and the edge gateway 144. The limits of the short range communication of an edge gateway 144 define a boundary 150 of the zone 142 in which a plurality of devices 152 are located. Zone 142 is defined by the edge gateway 144 to include devices 152 located at a first manufacturing line 154 and a second manufacturing line 156. Zone 142B is defined by the edge gateway 144 to include items 152 located in a first shipment 158 and in a second shipment 160. Zone 142C is defined by the edge gateway 144 to include the items 152 which could include energy equipment to provide power to the manufacturing lines 154 and 156 of zone 142A. The boundary of each of the zones is also called geo-fence. In other embodiments, a large geo fence is defined using each of the boundaries of each of the zones. In this embodiment, the large geo fence defines a perimeter of a facility or plant.

One or more of the devices 152, in each of the zones 142 is labeled or tagged with an identifier 127 as described with respect to FIG. 2. As the user 146 moves from zone to zone along a path 161, the edge gateway 144 provides the location of tagged devices within a particular zone when the user's mobile device 148 is located within the boundary 150 of any particular zone 142. Each of the mobile devices 148 include a user application, also known as a mobile agent or mobile application, installed on the mobile device. Each of the mobile devices supports the use of a software application, also known as an "app", which communicates with the control units through the cloud computing system 110 also known as the "cloud". The apps are stand-alone software applications which run on a user's mobile device.

As a user moves throughout the facility and in each of the zones, the mobile device using the mobile application receives signals sent from each of the Bluetooth beacons. Each of the beacons 120 continuously transmits a signal which includes a universally unique identifier (UUID) string, or sequence of identifying information, which represents the specific zone or area in which the beacon 120 is located. In one embodiment, each of the beacons transmits the UUID string or a uniform resource locator (URL) which is received by the mobile device.

Each of the zones contains, in different embodiments, one or more devices identified with the identifier. Each of the devices within a zone has been mapped to one of the zones and the relevant information is stored in a database stored in memory and accessible by one or more of the servers. The mobile device sends the UUID string to the connected server where the server identifies the particular devices associated with the beacon having transmitted the UUID string. The server, once identifying the devices, transmits device locations to the mobile device which are located in proximity. Upon receipt of the device information, all of the assets associated with the particular beacon are available for display on the mobile device. Once displayed, the user selects the device of interest to access additional information related to the particular device.

In one embodiment, the mobile application is installed on an authorized mobile device, a wearable device, or any other device having the capability to position itself using GPS or other location signals. The application is installed on secure and encrypted devices authorized by policies established by an organization and carried out by an information technology person or team. In some organizations, an employee makes use of his or her own device. In other organizations, the device used by an employee is only enabled for trusted communication for a specific period of time and place, which allows secure and verifiable transmission of information from the system.

Figure 4:
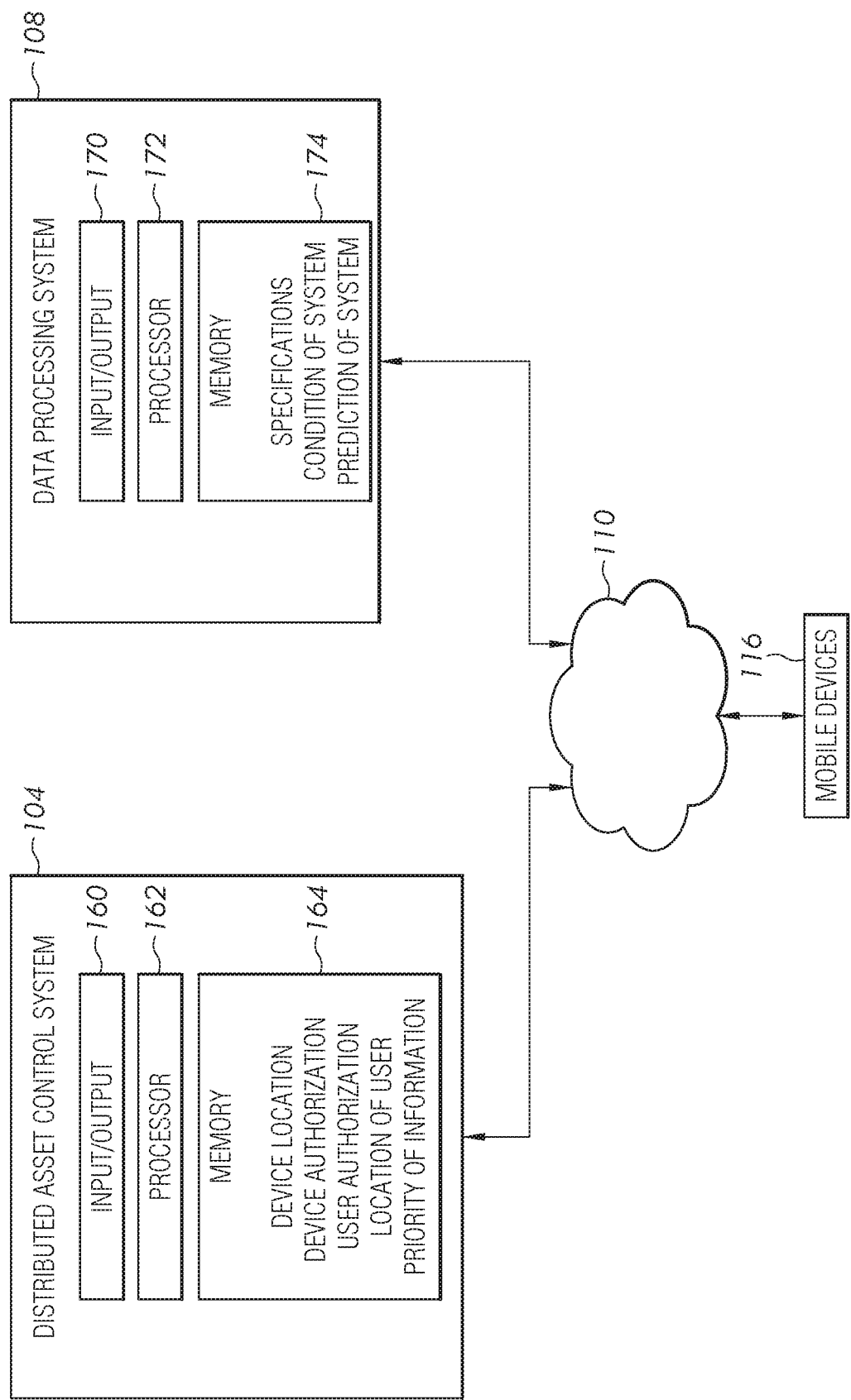
FIG. 4 is a block diagram of a mobile device communicating with a distributed asset control system and a data processing system.

To provide location information for each of the devices within a zone, the distributed asset control system 104 is configured, in one embodiment, as shown in FIG. 4. The distributed asset control system 104, which is operatively connected to the cloud based communication system 110, includes an input/output device 160 that allows the system 104 to communicate with the cloud based communication system 110. The cloud based communication system 110 is operatively coupled to the distributed asset control system 104, the data acquisition system 106 and the data processing system 108. These systems map an identification code for each of the beacons to a list of assets in close proximity to the beacon. As assets are added, removed, or moved from one zone to another zone, mapping of the beacon's identification code is updated.

For example, the input/output device 160 may be a network adapter, network card, Bluetooth card, interface, or a port (e.g., a USB port, serial port, parallel port, an analog port, a digital port, VGA, DVI, HDMI, FireWire, CAT 5, or any other type of port or interface). The input/output device 160 may be comprised of hardware, software, and/or firmware. It is contemplated that the input/output device 160 includes more than one of these adapters, cards, or ports. The system 104 further includes a processor 162 and a memory 164. In the depicted form, the processor 162 is of a programmable variety that executes algorithms and processes data in accordance with the operating logic as defined by programming instructions (such as software or firmware) stored in the memory 164. In one embodiment, the memory 164, in addition to storing programming instructions, stores a variety of different types of data organized in one or more data tables, which in different embodiments is organized based on a common subject or type of data. For instance, in FIG. 4, the memory 164 includes data identifying mobile device location within a zone, mobile device authorizations, user authorizations, location of a user, and priority of information.

The mobile device authorization information identifies a period of time to indicate a period of time over which the mobile device is authorized to communicate with the edge gateway 144 and the cloud based communication system 110. The device authorization time is limited to a specific period of time. In different embodiments, the period of time is in various increments of time, starting from a one hour duration, for instance, and extending to an entire duration of a working shift operation. Only devices that have the mobile agent installed are authorized.

The data processing system 108, as illustrated in FIG. 4, includes an input/output device 170 that allows the system 108 to communicate with the cloud based communication system 110. For example, the input/output device 170 may be a network adapter, network card, Bluetooth card, interface, or a port (e.g., a USB port, serial port, parallel port, an analog port, a digital port, VGA, DVI, HDMI, FireWire, CAT 5, or any other type of port or interface). The input/output device 170 may be comprised of hardware, software, and/or firmware. It is contemplated that the input/output device 170 includes more than one of these adapters, cards, or ports. The system 108 further includes a processor 172 and a memory 174.

In different embodiments, the data processing system 108 is operatively connected to the facility assets as illustrated in FIG. 1 to collect and analyze the operating conditions of each of the monitored assets. The processor 172 analyzes the operating conditions according to predetermined specifications. The operating conditions, in one embodiment, are stored in the memory 174 as a specification which details a desired operating condition of each of the assets. The processor compares the operating conditions of the system to determine a current condition of the system. In different embodiments, the current conditions are accessible by an operator of the system or by a mobile device user. In some embodiments, the current condition of the system is stored in memory over a period of time, such that an analysis of conditions that change over time may be used as a prediction of the how the operating conditions of the assets could change over time. For instance, a total operating time of an asset over time is used to determine when an asset requires maintenance.

Figure 5:
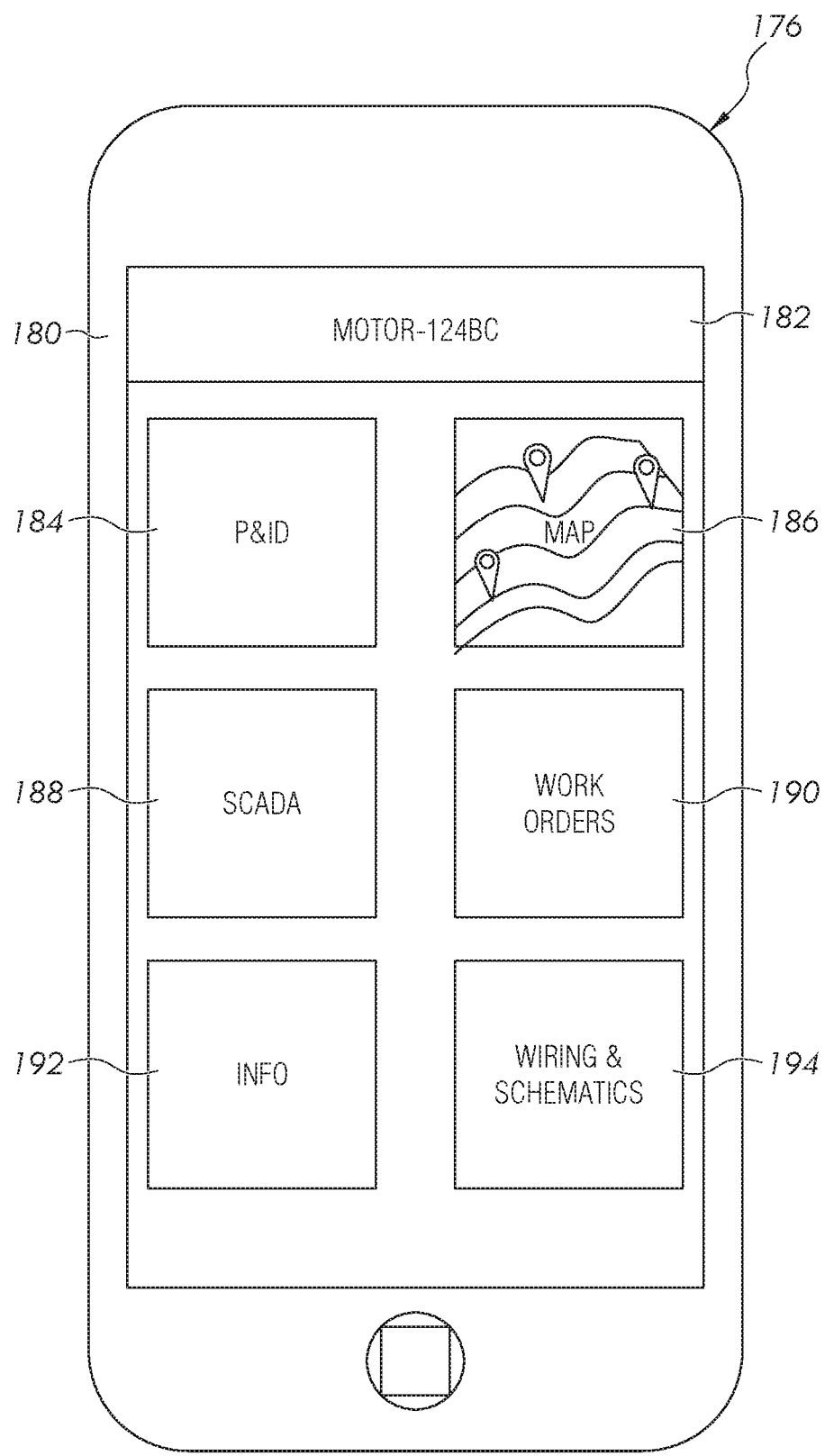
FIG. 5 is a user interface of a mobile device.

FIG. 5 illustrates a mobile device 176 including one embodiment of a user interface screen 180. In this embodiment, the user interface screen 180 includes an asset identifier 182, which in this illustrative embodiment is a motor identified as motor-124BC. Various icons on the user interface screen 180 identify different types of information available to the user through mobile device 176. In the illustrated embodiment, the user interface screen provides the following user icons: piping and instrumentation diagrams (P&ID) 184, maps 186, supervisory control and data acquisition (SCADA) 188, work orders 190, info 192, and wiring & schematics 194.

As described with respect to FIG. 3, as the user 146 moves from zone to zone, the edge gateway 144 provides the location of tagged devices within a particular zone when the user's mobile device 148 is located within the boundary 150 of any particular zone 142. The various icons displayed on the user interface screen 180 enable the user to access desired information with regard to the device 182. In one example, the user receives an alert generated by the supervisory control system 102 of FIG. 2 indicating that a particular piece of equipment or a device, such as the motor-124BC requires maintenance. Upon receipt of the alert, the user identifies the type of maintenance required by accessing a work order found using the work order icon 190. In addition, the user can determine the location of the piece of equipment with use of the map icon 186. As the user moves from one area or zone of the facility to another, the user device 176 provides updates of the location of the mobile device, and therefore the user, by updating the location of the user on the map accessed through the map icon 186.

Figure 6:
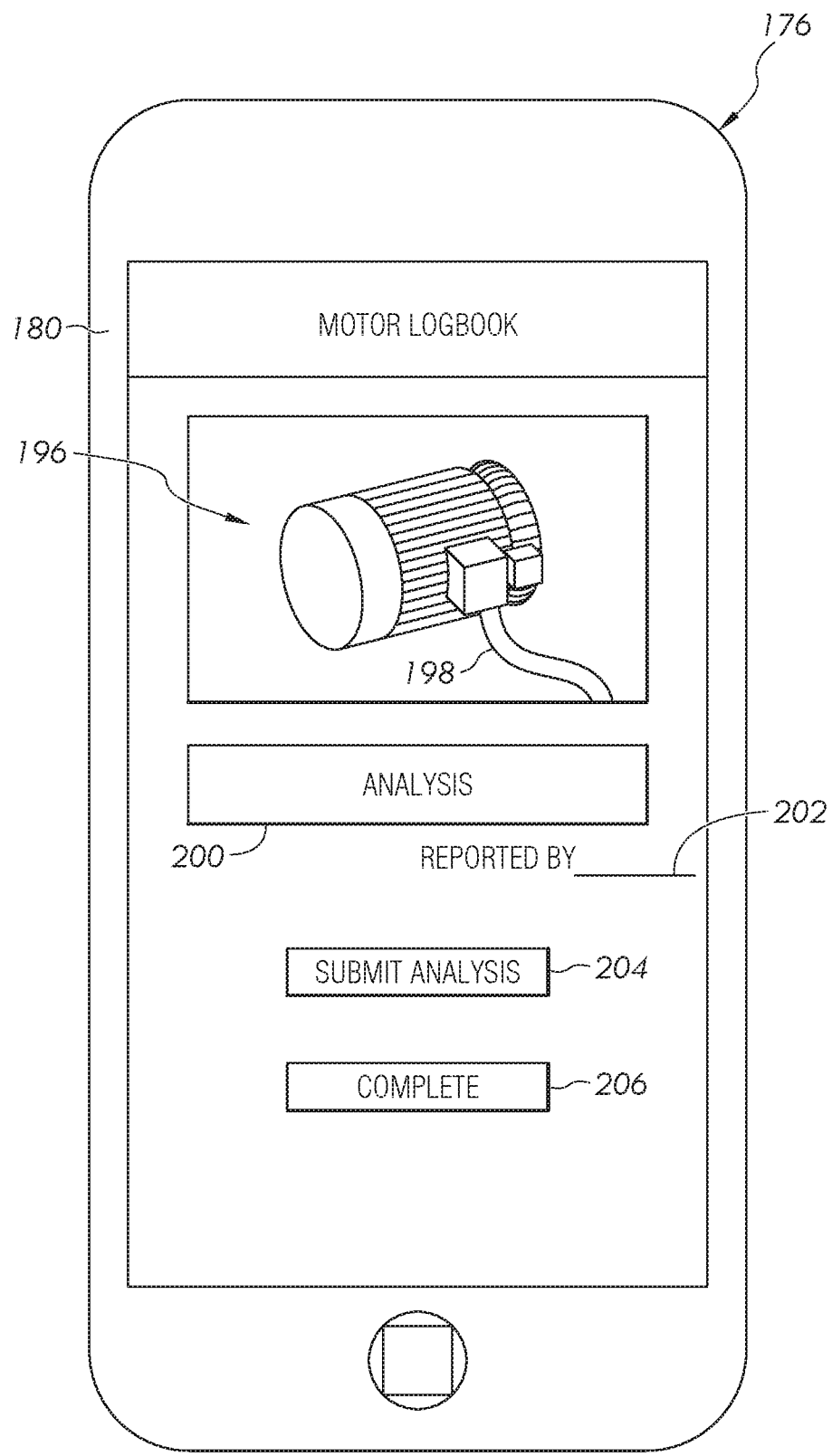
FIG. 6 is a user interface of a mobile device.

Once the user moves into the proper zone, the edge gateway or beacon 144 transmits a message to the user that the user has entered the appropriate zone where the piece of equipment is located. Once the user arrives at the location, the user confirms the identity of the equipment by scanning or by taking a photograph of the identifier 127 associated with the equipment as illustrated in FIG. 6. In one embodiment, the user takes a photograph 196 of the equipment, which in this instance is leaking oil 198. In addition to the photograph 196, the user has the ability to provide an analysis of the problem, which is typed into a text box 200 on the user interface screen. 180. In addition, the user has the option of identifying himself or herself at an identity box 202.

Once the equipment is identified, the user has access to information for that particular piece of equipment through the icons of FIG. 5 including piping and instrumentation diagrams (P&ID) 184, supervisory control and data acquisition (SCADA) 188, info 192, wiring and schematics 194. The identity of the equipment directs the supervisory control system 102 to provide information through each of these icons for only that particular piece of equipment. In the described embodiments, the SCADA 188 includes the supervisory control system 102.

To receive information from and provide information to a user, the SCADA 188 is configured with one or more applications, also known as adapters. The adapters include a user adapter, a location adapter, and a priority and criticality adapter. The user adapter includes a list of users authorized to receive information. When the data processing system 108 generates meaningful information, the system 108 interacts with the user adapter to identify the list of users. Another application is configured on the system to identify the current shift operations for the users. Based on this database, the system includes a list of users to whom it can send information based on the source of the signal.

The SCADA 188, in this and other embodiments, includes a location application which identifies a list of users in close proximity to a device. The mobile applications passively transmit current location of the mobile device with respect to the closest beacon.

The SCADA 188 is configured to interrogate the location application with a zone or asset identifier to obtain a list of candidate users that are in close proximity to particular beacon. The location application, in different embodiments, utilizes a location vector to identify a path and trajectory of the user to the appropriate beacon and identifies those zones or beacons that are on the way to the asset.

The SCADA 188, in different embodiments, includes a priority and criticality adapter which identifies the priority and criticality of the information. The priority and criticality Adapter generates a list of rankings for the generated information.

In other embodiments, information of other equipment within the same zone as the identified piece of equipment is accessible. In this procedure, the other equipment may be operatively connected to the identified piece of equipment and such information may be useful to the user in identifying a problem, should one exist. Upon completion of the analysis, the user provides a summary in the text box 200. In one embodiment, submission of the summary with a submit button 204 indicates that a resolution to the work order has been reached. In another embodiment, a complete button 206 is provided on the user interface screen 180 to indicate completion of a work order.

Each of the mobile devices 176 is associated with a particular user while in use. In one embodiment, each of the mobile devices is associated with a single user, such that only one device is used by that individual. In other embodiments, a single mobile device 176 is used by multiple users. In either embodiment, the user is authorized by the supervisory control system 102 before the user is able to access the information required to review work order and analyze equipment issues. In other embodiments, a user is authorized for only one or a few zones, but not all zones.

Figure 7:
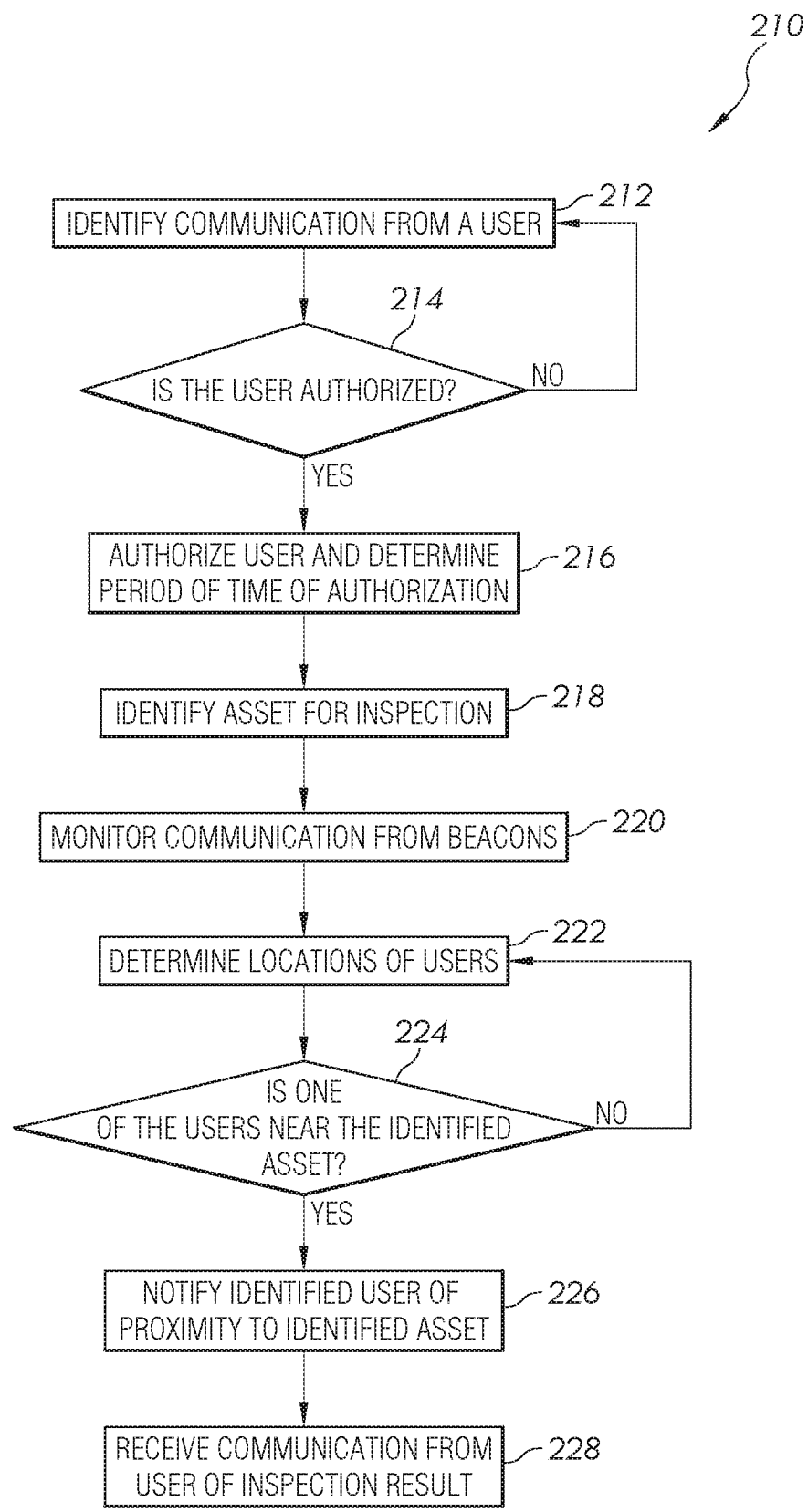
FIG. 7 is a process diagram of a method of managing industrial assets.

FIG. 7 illustrates one embodiment of a process diagram 210 configured to enable a user to access the information system 100. When a user begins a workday, the user communicates with the information system 100, which identifies the user at block 212. Upon identifying the communication from the user at block 212, the system determines whether the user is authorized at block 214. If the user is not authorized, the system continues to identify communications from users of mobile devices. If the user is authorized, the system authorizes the user and determines a period of time for authorization at block 216. In different embodiments, the period of time of authorization is pre-determined and stored in a database located at the supervisory control system 102. This pre-determined period of time is based on one or more factors, including which shift the user is working or which time of day the user is expected to perform maintenance or inspection. In other embodiments, the period of authorization is associated with a zone such that a user is limited to a particular zone during a certain time of day wherein the user is only authorized to perform maintenance checks in certain zones and only during certain times of the day. These different embodiments are not, however, the only embodiments of time authorization, but other types of authorization are contemplated.

For instance, in one embodiment the supervisory control system 102 includes a device authorization adapter which is configured to generate a time-bound QR code for only valid period of time, for instance two (2) minutes. If a malicious user takes a photograph of the QR code and tries to utilize it later, the QR code will be no longer be valid. Additionally the device adapter queries the location from the mobile application and only those devices that are within the boundary of a zone are authorized.

The user takes a picture of the QR code and the mobile application securely transmits mobile device information. Based on this handshake between mobile device and the supervisory control system, the mobile device is authorized to be used for the allotted period of time.

Once the mobile device has been authorized, the mobile device is enabled to receive notifications and to transmit a current location. Also, the mobile application passively identifies the beacons as the user moves through the facility.

The mobile application is configured with a geo-fence or perimeter around the plant or facility. The mobile device is triggered as the user enters the geo-fence which, in one embodiment, is identified by a global positioning system (GPS) location. The geo-fence is established to indicate the perimeter about a specific location. In different embodiments, the geo-fence is set for 5 meters, 10 meters or 30 meters from a specific location identified by a GPS coordinate. Once the mobile device leaves the area, it is no longer authorized. User authorization is temporarily disabled and access to secure data while the user is away from the plant at the end of the shift is prevented. Since devices can be lost, taken home, or innocently used by family members, location data, time-shift data, and other information is used to disable data display. User authorization, in other embodiments, can be permanently disabled until reset.

In other embodiments, a facility or company issued device is provided to backup crews which are configured to override the restrictions of the geo-fence and the time duration authorization on an as needed basis. However for the rest of the user mobile devices, once the time has expired and/or the device is outside the secure premises, the device resumes its normal mode of operations and is no longer authorized to receive and transmit data. The time based QR codes and mobile application working in tandem consequently secure time and location based data transmission and reception.

Before, during, or after authorization of the user at block 216, an asset is identified for inspection at block 218. In one embodiment, the asset is identified by an equipment sensor located at the asset which provides asset operating characteristics to data acquisition system 106. The equipment sensor, in different embodiments, provides an alarm identifying different undesirable operating characteristics. In other embodiments, sensors provide operating characteristics of the monitored asset over a period to time, which is then analyzed to determine a trend toward reduced or unwanted operability of the asset. In different embodiments, the sensor is integral with the associated industrial asset. In other embodiments, the sensors are discrete or separate from the associated industrial asset.

Examples of the asset data collected by the sensors include, but are not limited to, industrial asset configuration data, industrial asset condition data, and industrial asset performance data. Examples of industrial asset condition data include, but are not limited to, operating speed, power supply capability, operating temperatures, value of load supplied by industrial asset, current measurement, voltage measurement, time elapsed since last maintenance, current firmware version, and other operation parameters. An example of industrial asset performance data includes, but is not limited to, whether an industrial asset is operating below specification due to degradation or reduced performance of the asset. Examples of types of sensors include, but are not limited to, temperature sensors, voltage sensors, current sensors, and microprocessor sensors.

Once an asset is identified as one requiring an inspection, the asset is identified in the supervisory control system 102. In different embodiments, the identity information includes priority information, such as high priority as well as criticality, indicating the urgency of the task to be undertaken.

At the same time, communication to and from each of the beacons is monitored at block 220. Each of the assets' locations are known and identified within one of the zones, and consequently, a beacon associated with a particular asset is also known. Once the asset is identified for inspection, the system 100 determines the location of each of the authorized users at block 222 with respect to each of the beacons. At block 224, the system determines whether one of the users is near the identified zone and consequently in the proximity of the identified asset. If none of the users is near the identified asset, the system continues to determine the location of each of the users. If, however, one of the users is near the identified asset, the system notifies the identified user of being proximate to the asset requiring an inspection at block 226. After notification, the user proceeds to identify correct the problem, if possible as previously described. After the inspection has been completed, the user transmits the result of the inspection from the mobile device and to the supervisory control system 102 for further processing at block 228.

In another embodiment, operating characteristics of a fleet of devices, for instance motors, is determined during device operation over a period of time. A fleet generally includes a plurality of devices which are located in all of the plants or facilities and across all locations. The fleets, however, can include any number of devices in a single facility or in multiple facilities, in one or more locations.

In some fleets, for instance, the number of motors exceeds a thousand motors. The operations of all of the motors is monitored and analyzed in the cloud or other computing facility to provide a machine learning model of the operation of each one of the motors in the fleet. This model provides the operating characteristics of each of the devices and is particularly advantageous since the operation of one or more of the devices depend on the operation of one or more other devices, which can be identified as a fleet trained model. The fleet trained model is stored in a memory in the cloud, or elsewhere, to provide a set of operating characteristics for the entire fleet. The model is either stored as a baseline model or is updated over one or more periods of time to indicate trends in the operating characteristics the devices being monitored.

Once the model is established, the system continuously monitors the operation of each motor by receiving a realtime stream of operating data provided by each of the motors, for example. This realtime stream of data is used by the system to continuously determine a condition of a motor, wherein the condition is available in realtime by making a comparison between the realtime stream of data and the stored operating characteristics. Should any of the monitored devices experience an anomaly or fault, the occurrence of the anomaly is made available on the cloud for one or more of the authorized users. For instance, if an authorized user is moving through a facility and is sufficiently close to the motor having the anomaly, the occurrence of the anomaly is communicated in realtime to the authorized user. Under these conditions, the ability to perform and respond to realtime streaming of data is opportunistic in the sense that the user of the mobile device is in the right place at the right time. The system is configured to take advantage of the realtime processing of data by alerting authorized users in realtime of any device events requiring a response. This embodiment, therefore, provides opportunistic realtime analytics against the fleet trained models.

The disclosed system seamlessly invokes applications located throughout the system continuously and transmits the information to users. In one example of a workflow operation for a user, the user arrives for a shift operation and carries a mobile device with the mobile application.

The user accesses the device authorization application to enable the mobile device to receive notifications for a period of 4 hours. The user, during a shift, moves through the plant to perform work. As the user approaches a pump which has been identified by the system as a candidate for inspection, a notification is received. At that time, the user is in position to make an inspection and identify or resolve any issues. If the user leaves the plant for a meeting, the device authorization is disabled.

As described herein, the disclosed system and method provides access to information generated by the system in tandem with existing industrial automation systems to a larger group of users that are enabled by sending the right analytics insight to the right people at the right time and space. While more information can be provided, the information is more relevant and provides immediately actionable insights. In addition the system relies on location data transmitted by field operations and their proximity to physical assets (devices, faceplates, valves, pumps).

Users of the system are, therefore, able to make better decisions and react to abnormalities and disturbances much more rapidly. Users are also able to remove bottlenecks and leverage the strength of the entire organization. Fewer people are required in the control room and back offices whose role is to coordinate information. Newer employees are able to quickly ramp up and become aware of their surroundings utilizing much more streamlined mobile applications that provide an awareness of immediate surroundings. In addition, users can make updates to their field operations without requiring overhaul of analytics systems.

Users of the system do not only include users moving about a facility but include, in different embodiments, users located or responsible for control rooms, field operations, maintenance, administrative, Management, and Executive roles.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Also, although the disclosure has been shown and described with respect to one or more implementations, equivalent alterations and modifications will occur to others skilled in the art based upon a reading and understanding of this specification and the drawings. The disclosure includes all such modifications and alterations and is limited only by the scope of the following claims. In particular regard to the various functions performed by the above described components, systems, subsystems and modules (e.g., elements, resources, etc.), the terms used to describe components, systems, subsystems and modules are intended to correspond, unless otherwise indicated, to any components, systems, subsystems and modules which performs the specified function of the described components, systems, subsystems and modules (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An industrial equipment system configured to monitor a plurality of industrial assets, the system comprising:
    a plurality of identifying tags, wherein each of the identifying tags is configured to be physically located with one of the plurality of industrial assets;
    a plurality of transponders, wherein each of the transponders is configured to have a predetermined range of communication and wherein each of the transponders transmits a unique transponder identifier identifying the transponder, wherein each of the transponders is associated with a different one of a plurality of zones, wherein each of the zones includes a boundary defined by the predetermined range of communication of the associated transponder and includes two or more of the plurality of industrial assets therein with associated identifying tags;
    a data acquisition and processing system configured to receive, to process, and to store in a memory, the received and processed asset data associated with the plurality of industrial assets; and
    a mobile device software application configured to reside on a mobile device, wherein the software application is configured: i) to receive the transponder identifier transmitted by the transponder in response to the mobile device entering the zone defined by associated transponder; ii) to transmit the transponder identifier with the mobile device over a communication system to the data acquisition and processing system; and iii) to receive and display on the mobile device asset data from the data acquisition and processing system for each of the assets in the zone of the associated transponder as the mobile device moves from one the plurality of zones to another of the plurality of zones.

2. The industrial equipment system of claim 1 wherein the mobile device software application is configured to transmit a mobile device identifier including an identity of the mobile device.

3. The industrial equipment system of claim 2 wherein the data acquisition and processing system comprises a controller operatively connected to the memory that is configured to store program instructions, and the controller is configured to execute the stored program instructions to:
    electronically identify one of the transponders based on the associated transponder identifier;
    electronically identify the one or more of the plurality of industrial assets located within the zone determined by the identified transponder identifier; and
    generate a list of the identified industrial assets associated with the zone.

4. The industrial equipment system of claim 3 wherein the mobile device software is configured to store the list of identified industrial assets associated with the zone.

5. The industrial equipment system of claim 4 wherein the mobile device software is configured to identify one of the industrial assets in the stored list of identified devices.

6. The industrial equipment system of claim 5 wherein the mobile device software is configured to transmit the identified industrial asset to the data acquisition and processing system.

7. The industrial equipment system of claim 6 wherein the controller is configured to execute the stored program instructions to provide data associated with the identified industrial asset.

8. The industrial equipment system of claim 7 wherein the mobile device software is configured to display the data associated with the identified industrial asset.

9. The industrial equipment system of claim 2 wherein the data acquisition and processing system comprises a controller operatively connected to the memory that is configured to store program instructions, and the controller is configured to execute the stored program instructions to:
  compare the identity of the mobile device identifier with a predetermined list of authorized mobile devices; and
  enable communication with the identified mobile device if authorized.

10. The industrial equipment system of claim 9 wherein the compare the identity step includes comparing with a predetermined list of authorized mobile devices having time periods of authorization indicating the authorization of the mobile device and a time period over which the mobile device is authorized to receive asset data from the data acquisition and processing system.

11. The industrial equipment system of claim 10 wherein the controller is configured to execute the stored program instructions to:
  electronically identify one of the transponders based on the associated the transponder identifier;
  electronically identify the one or more of the plurality of industrial assets located within the zone determined by the identified transponder identifier; and
  generate a list of the identified industrial assets associated with the zone.

12. The industrial equipment system of claim 11 wherein the mobile device software is configured to store the list of identified industrial assets associated with the zone.

13. The industrial equipment system of claim 12 wherein the mobile device software is configured to identify one of the industrial assets in the stored list of identified device.

14. The industrial equipment system of claim 13 wherein the mobile device software is configured to transmit the identified industrial asset to the data acquisition and processing system.

15. The industrial equipment system of claim 14 wherein the controller is configured to execute the stored program instructions to provide data associated with the identified industrial asset.

16. The industrial equipment system of claim 15 wherein the mobile device software is configured to display the data associated with the identified industrial asset.

17. A method of monitoring operating conditions of an industrial equipment system including a plurality of industrial assets, the method comprising:
  monitoring communications from a plurality of mobile devices;
  authorizing one or more of the plurality of mobile devices to receive industrial asset information;
  determining a location of each of the one or more of the authorized mobile devices, wherein the location is determined by one of a plurality of transponders that each include a unique identifier and a predetermined range of communication associated with one of a plurality of zones that each include two or more of the plurality of industrial assets;
  generating a list of the two or more of the plurality industrial assets within the associated one of the plurality of zones based on the location of the one or more of the authorized mobile devices as the one or more of the authorized mobile devices move from one of the plurality of zones to another of the plurality of zones; and
  receiving information related to one of the listed industrial assets in the associated one of the plurality of zones from the one or more of the authorized mobile devices in the associated zone.

18. The method of claim 17 wherein the authorizing step includes authorizing each of the plurality of mobile devices to receive industrial asset information based on a time period of authorization during which the mobile device is authorized to receive asset data.

19. The method of claim 18 further comprising identifying one of the industrial assets as requiring an inspection.

20. The method of claim 19 further comprising identifying one or the authorized mobile devices based on the location of the identified industrial asset and the location of the authorized mobile device.

21. The method of claim 20 further comprising notifying the identified mobile devices of the identity of the identified industrial asset.

* * * * *